US012664687B2

(12) United States Patent
Wu et al.

(10) Patent No.: US 12,664,687 B2
(45) Date of Patent: Jun. 23, 2026

(54) VIRTUAL IMAGE DISPLAY SYSTEM AND OPERATION METHOD THEREOF

(71) Applicant: HTC Corporation, Taoyuan City (TW)

(72) Inventors: Jun Rei Wu, Taoyuan City (TW); Kuan-Hsun Wang, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 235 days.

(21) Appl. No.: 18/599,201

(22) Filed: Mar. 8, 2024

(65) Prior Publication Data

US 2025/0285326 A1     Sep. 11, 2025

(51) Int. Cl.
| | |
|---|---|
| *G06T 7/80* | (2017.01) |
| *G06F 3/01* | (2006.01) |
| *G06T 7/70* | (2017.01) |
| *G06T 19/00* | (2011.01) |

(52) U.S. Cl.
CPC ............... *G06T 7/80* (2017.01); *G06F 3/011* (2013.01); *G06T 7/70* (2017.01); *G06T 19/006* (2013.01); *G06T 2200/24* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 11,592,902 B2 | 2/2023 | Daniels | |
| 2013/0120224 A1* | 5/2013 | Cajigas | ..............  G02B 27/0172 345/8 |
| 2024/0078773 A1* | 3/2024 | Kim | ........................ G06T 15/20 |

FOREIGN PATENT DOCUMENTS

| | | | | |
|---|---|---|---|---|
| CN | 111492405 | | 8/2020 | |
| CN | 113538700 A | * | 10/2021 | ..........  G06T 19/006 |
| CN | 112525185 | | 10/2022 | |
| CN | 117631823 | | 3/2024 | |
| TW | 202401080 | | 1/2024 | |
| TW | 202409658 | | 3/2024 | |

OTHER PUBLICATIONS

"Office Action of Taiwan Counterpart Application", issued on Dec. 5, 2024, p. 1-p. 8.

* cited by examiner

*Primary Examiner* — Yingchun He
(74) *Attorney, Agent, or Firm* — JCIPRNET

(57) ABSTRACT

A virtual image display system and an operation method thereof are provided. The operation method of the virtual image display system includes: using a plurality of cameras to perform image capturing action on a target portion of a user and obtain a plurality of image information; using the cameras to obtain a plurality of position information corresponding to the target portion according to the image information; using a head-mounted display (HMD) to receive the position information, calculate an extrinsic parameter according to the position information, and establish a plurality of re-projection image information according to the extrinsic parameter and the position information; using the HMD to obtain a plurality of error information according to a prediction image information and the re-projection image information; and using the HMD to display each error information and calibrate the extrinsic parameter to obtain a calibrated extrinsic parameter according to the error information.

15 Claims, 6 Drawing Sheets

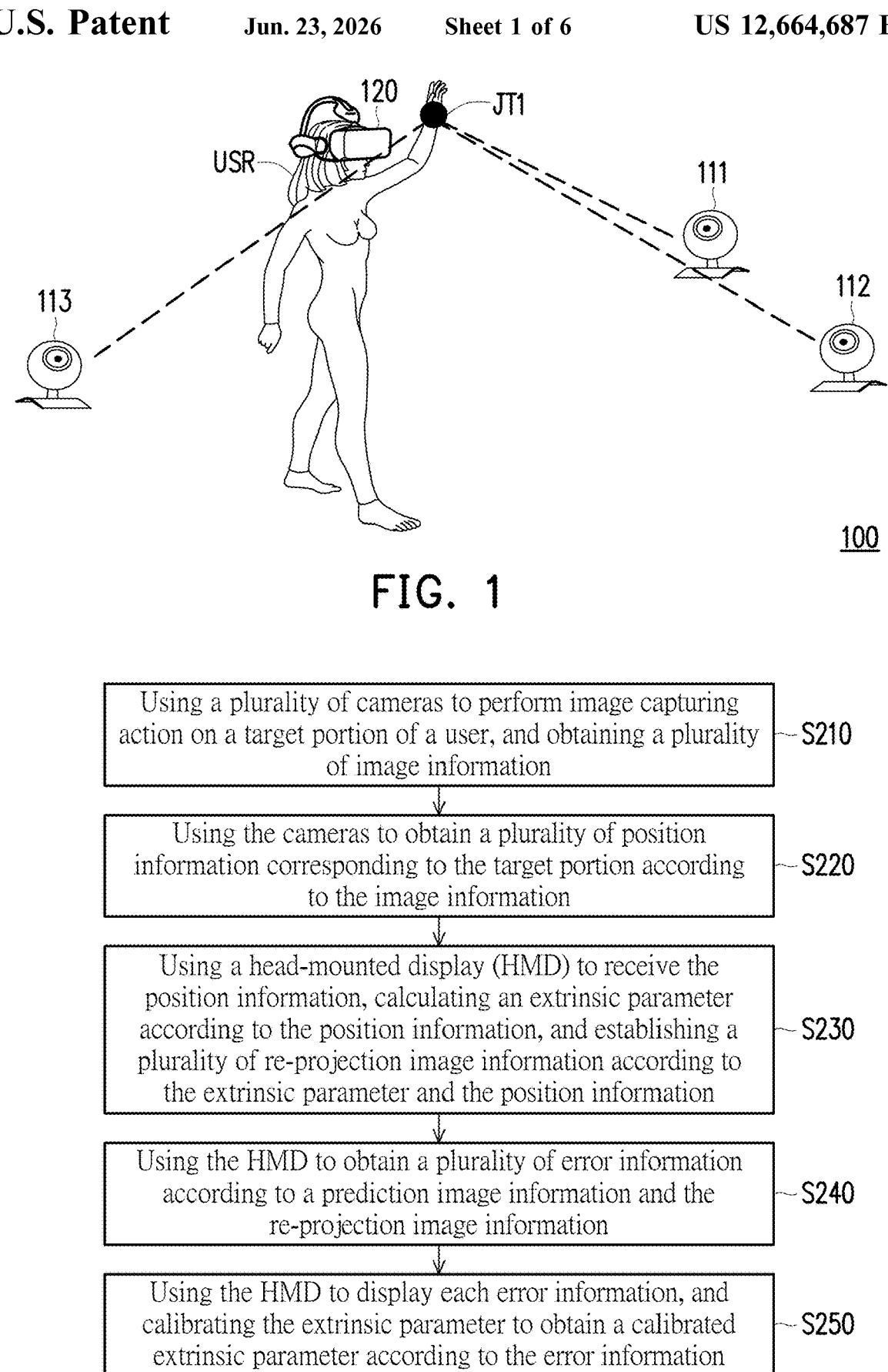

FIG. 1

| Using a plurality of cameras to perform image capturing action on a target portion of a user, and obtaining a plurality of image information | S210 |

| Using the cameras to obtain a plurality of position information corresponding to the target portion according to the image information | S220 |

| Using a head-mounted display (HMD) to receive the position information, calculating an extrinsic parameter according to the position information, and establishing a plurality of re-projection image information according to the extrinsic parameter and the position information | S230 |

| Using the HMD to obtain a plurality of error information according to a prediction image information and the re-projection image information | S240 |

| Using the HMD to display each error information, and calibrating the extrinsic parameter to obtain a calibrated extrinsic parameter according to the error information | S250 |

FIG. 2

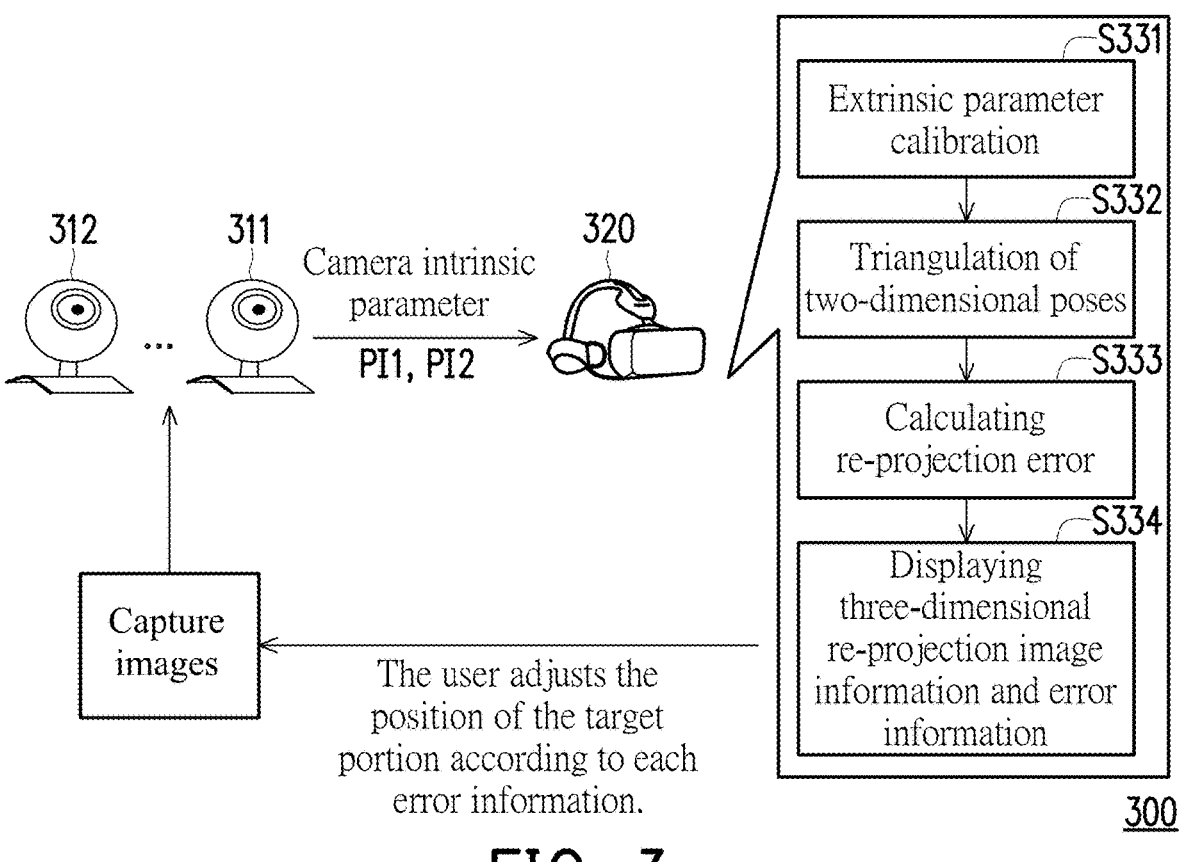

312   311   Camera intrinsic parameter   320

PI1, PI2

Capture images

The user adjusts the position of the target portion according to each error information.

S331
Extrinsic parameter calibration

S332
Triangulation of two-dimensional poses

S333
Calculating re-projection error

S334
Displaying three-dimensional re-projection image information and error information

Calculating extrinsic parameters between cameras — S410

Calculating the three-dimensional joint image information to obtain the re-projection image information according to the extrinsic parameters and the two-dimensional joint image information — S420

Calculating the three-dimensional joint prediction image information by the vision system of the head-mounted display — S430

FIG. 4A

Establishing the three-dimensional image information according to the calibrated extrinsic parameters and two-dimensional image information ~S710

Mixing the full body avatar in the augmented reality ~S720

Displaying the full body action of the user ~S730

VIRTUAL IMAGE DISPLAY SYSTEM AND OPERATION METHOD THEREOF

BACKGROUND

Technical Field

The invention relates to a virtual image display system and an operation method thereof, and in particular, to a calibration method for an interactive virtual image display system.

Description of Related Art

In the virtual image display system, in order to enable accurate conversion between the coordinate systems of the displayed images between the camera and the head-mounted display, the extrinsic parameter calibration of the camera of the conventional technology requires the preparation of an ArUco marking board. Then, each camera is placed at different positions to take pictures of the ArUco marking board, and then the extrinsic parameters of the camera array are calculated by executing a calibration algorithm. With this approach, when you want to perform the calibration of the extrinsic parameters again, you must reset the ArUco marking board and take another photo of it. It has relatively high complexity in execution.

SUMMARY

The invention provides a virtual image display system and an operation method thereof, which can optimize parameter calibration actions in the virtual image display system.

The operation method of the virtual image display system of the present invention includes: using a plurality of cameras to perform image capturing action on a target portion of a user and obtain a plurality of image information; using the cameras to obtain a plurality of position information corresponding to the target portion according to the image information; using a head-mounted display (HMD) to receive the position information, calculate an extrinsic parameter according to the position information, and establish a plurality of re-projection image information according to the extrinsic parameter and the position information; using the HMD to obtain a plurality of error information according to a prediction image information and the re-projection image information; and using the HMD to display each error information and calibrate the extrinsic parameter to obtain a calibrated extrinsic parameter according to the error information.

The virtual image display system of the present invention includes a plurality of cameras and a head-mounted display (HMD). The cameras perform image capturing action on a target portion of a user and obtain a plurality of image information. The cameras provide a plurality of position information corresponding to the target portion according to the image information. The HMD is coupled to the cameras, receives the position information, calculates an extrinsic parameter according to the position information, establishes a plurality of re-projection image information according to the extrinsic parameter and the position information, obtains a plurality of error information according to a prediction image information and the re-projection image information, displays each of the error information, and calibrates the extrinsic parameter to generate a calibrated extrinsic parameter according to each of the error information.

Based on the above, the virtual image display system of the present invention takes pictures of the target portion of the user by using the cameras. And through the HMD, the calibration action of the extrinsic parameter between the cameras and the HMD is executed according to the position information of the target portion in the image information captured by the cameras. Furthermore, the HMD can further optimize the calibration action of the extrinsic parameter by displaying the error information, the re-projection image information and each image information.

BRIEF DESCRIPTION OF THE DRAWINGS

FIG. 1 illustrates a schematic diagram of a virtual image display system according to an embodiment of the present invention.

FIG. 2 illustrates a flow chart of an operation method of the virtual image display system.

FIG. 3 illustrates a schematic diagram illustrating the operation method of the virtual image display system according to the embodiment of the present invention.

FIG. 4A and FIG. 4B illustrate a flow chart of the re-projection image information of the virtual image display system and the related extrinsic parameter calibration method according to the embodiment of the present invention.

DESCRIPTION OF THE EMBODIMENTS

Figure 4B:
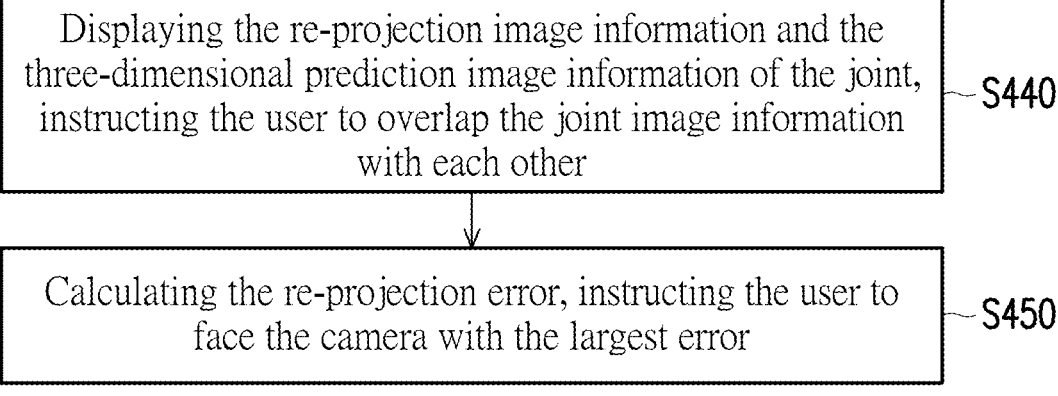

Referring to FIG. 1, FIG. 1 illustrates a schematic diagram of a virtual image display system according to an embodiment of the present invention. The virtual image display system 100 includes a plurality of cameras 111~113 and a head-mounted display (HMD) 120. The cameras 111~113 and the HMD 120 can be coupled to each other wirelessly. Among them, the virtual image display system 100 can perform extrinsic parameter calibration between the cameras 111~113 and the HMD 120. Among them, the so-called extrinsic parameter includes rotation and translation information between the coordinate system of each camera 111~113 and the coordinate system of the HMD 120.

It is worth mentioning that, in the embodiment, in the initial state, the cameras 111~113 set outside the HMD 120 can use Simultaneous Localization And Mapping (SLAM) to perform map sharing with the HMD 120. Furthermore, each camera 111~113 can execute an attitude tracking algorithm that supports three-dimensional attitude prediction and independently calibrate the extrinsic parameter between each camera 111~113 and the HMD 120 according to the position of the three-dimensional projection of the cameras 111~113 on the HMD 120, and thereby establish an initial extrinsic parameter.

When the virtual image display system 100 performs the calibration action of the extrinsic parameters between the cameras 111~113 and the HMD 120, it can synchronously refer to a flow chart of an operation method of the virtual image display system in FIG. 2. Among them, in Step S210, the virtual image display system 100 can enable the cameras 111~113 to perform image capturing actions on a target portion of the user USR, and obtain multiple image information respectively. In the embodiment, the HMD 120 can be worn on the user USR. When performing extrinsic parameter calibration action, any joint of the user USR (such as wrist joint JT1) can be used as the target portion. The cameras 111~113 perform image capturing actions on the wrist joint JT1 of the user USR, and thereby obtain multiple image information respectively. In the embodiment, the image information obtained by the cameras 111~113 respectively can be three-dimensional or two-dimensional image information.

Then, in step S220, the virtual image display system 100 can enable the cameras 111~113 to provide multiple position information of the corresponding target portion according to the obtained image information. Among them, the position information obtained by the cameras 111~113 respectively can be the two-dimensional coordinate value of the target portion in the image information in the coordinate system of each camera 111~113. Furthermore, the cameras 111~113 can transmit the obtained position information to the HMD 120 through wireless communication. In details, each camera 111~113 can calculate the coordinate values of multiple feature points in the obtained image information, and thereby obtain position information.

In step S230, the HMD 120 can receive the location information provided by the cameras 111~113, and calculate the extrinsic parameters between the HMD 120 and the cameras 111~113 according to the received location information. The HMD 120 can solve the unknown numbers in the projection matrix by extracting and matching the feature points of the target image, and thereby perform the extrinsic parameter calibration action.

Furthermore, the HMD 120 can establish multiple re-projection image information of the wrist joint JT1 of the user USR corresponding to the cameras 111~113 respectively according to the extrinsic parameters. Among them, the HMD 120 can establish three-dimensional reprojection image information of the target portion of the user USR corresponding to the cameras 111~113 respectively through a triangulation positioning method according to the obtained extrinsic parameters and the two-dimensional position information provided by each camera 111~113.

Then, the HMD 120 can predict the three-dimensional prediction image information of the target portion of the user USR through the configured visual system. In step S240, the HMD 120 can obtain a plurality of error information according to the obtained prediction image information and the plurality of reprojection image information established in step S230. In details, the HMD 120 can calculate corresponding error information according to the position deviation between the image of the target portion in the prediction image information and the image of the target portion in each reprojection image information.

In step S250, the HMD 120 can display the calculated error information, and further perform calibration on the extrinsic parameter based on the error information to obtain a calibrated extrinsic parameter. In details, in step S250, the HMD 120 can enter an interactive mode. In the interactive mode, the HMD 120 can find the cameras 111~113 corresponding to a maximum error value in the error information. And the user USR is instructed to adjust the position or orientation of the target portion so that the prediction image information and the reprojected images of the cameras 111~113 corresponding to the maximum error value are close to and overlap each other, and thereby reduce the corresponding error value and optimize the obtained extrinsic parameter.

By the way, in the embodiment, the virtual image display system can be a virtual reality image display system, an augmented reality image display system or a mixed reality image display system.

Referring to FIG. 3 below, FIG. 3 illustrates a schematic diagram illustrating the operation method of the virtual image display system according to the embodiment of the present invention. In FIG. 3, the virtual image display system 300 includes two or more cameras 311, 312 and a head-mounted display (HMD) 320. The cameras 311, 312 are used to perform image capturing operations on the target portion of the user to obtain image information, where the target portion is, for example, any joint of the user. The cameras 311, 312 can provide the position information PI1, PI2 of the target portion in the image information to the HMD 320, wherein the position information PI1 and PI2 can be the coordinate values of the user's joints in the corresponding image information. Besides, internal parameters of the cameras 311, 312 are also provided to the HMD 320. Among them, the internal parameters of the cameras 311 and 312 are also called camera calibration, which are used as parameters needed to find the projection from three-dimensional space to two-dimensional picture for an image captured by a single camera, such as focal length, principal point position and distortion (distortion coefficient). These internal parameters are determined by a physical state of the lenses of the cameras 311, 312 themselves. In the embodiment, the internal parameters of the cameras 311, 312 are known values.

The HMD 320 is used to execute the step S331 according to the position information PI1, PI2 to execute the action of the extrinsic parameter. Moreover, the HMD 320 can perform the triangulation action for the two-dimensional posture by executing the step S332, and can thereby generate three-dimensional re-projection image information. The HMD 320 can generate the prediction image information of the user's joints and calculate a reprojection error in the step S333. Among them, the reprojection error can be an error information of position offset between the re-projection image information and the prediction image information. In step S334, the HMD 320 can display three-dimensional re-projection image information and the error information.

According to the re-projection image information and the error information displayed by the HMD 320, the HMD 320 can interact with the user and instruct the user to adjust the target portion (rotate or move the position of its joints). While performing the position adjustment action of the target portion, the cameras 311 and 312 can perform image capturing actions on the user's target portion in real time, and can dynamically perform optimization actions of extrinsic parameters.

Referring to FIG. 4A and FIG. 4B below, FIG. 4A and FIG. 4B illustrate a flow chart of the re-projection image information of the virtual image display system and the related extrinsic parameter calibration method according to the embodiment of the present invention. In FIG. 4A, the virtual image display system can perform calculation action of the error information of the extrinsic parameters between the cameras. Among them, in step S410, the HMD in the virtual image display system can be used to calculate extrinsic parameters between cameras. In step S420, the HMD can calculate three-dimensional joint image information based on the extrinsic parameter and two-dimensional joint image information obtained by the camera, and thereby obtain the re-projection image information corresponding to each camera. Then, in step S430, the HMD can calculate the prediction image information of the three-dimensional joints through the visual system.

Figure 5:
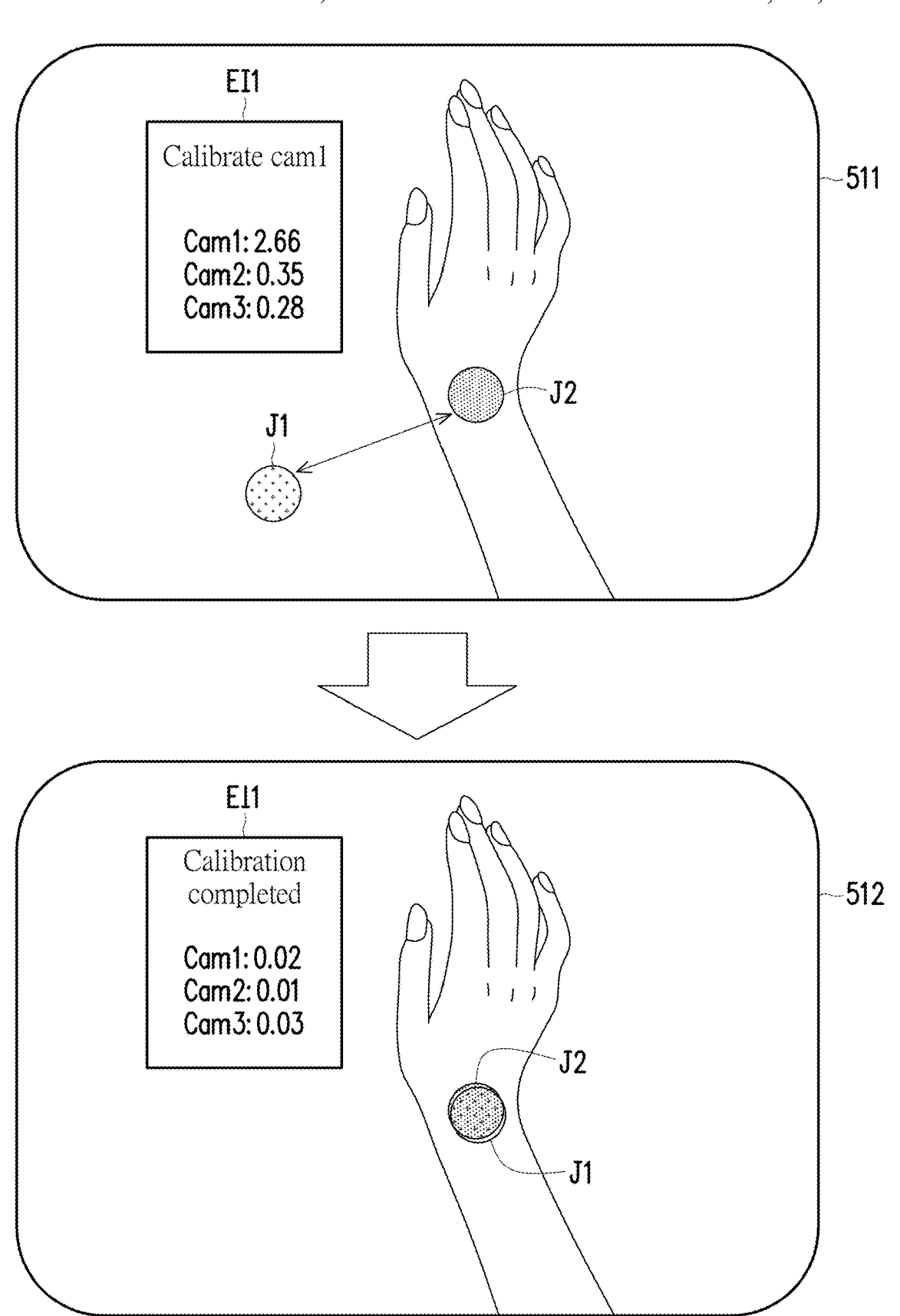
FIG. 5 illustrates a schematic diagram of the calibration action of the virtual image display system.

In FIG. 4B, the virtual image display system can interact with the user and perform the optimization action on extrinsic parameters. Among them, in step S440, the HMD can display the re-projection image information and the prediction image information of the three-dimensional joints. The HMD instructs the user to move the joint positions by displaying prompt commands, so that the joint parts in two image information overlap each other. Referring to FIG. 5, FIG. 5 illustrates a schematic diagram of the calibration action of the virtual image display system. In the display screen 511 of the HMD, the HMD displays the error information EI1 and indicates that there is an error value of 2.66 between the prediction image information and the re-projection image information of the corresponding camera Cam1; there is an error value of 0.35 between the prediction image information and the re-projection image information of the corresponding camera Cam2; there is an error value of 0.28 between the prediction image information and the re-projection image information of the corresponding camera Cam3.

Based on the fact that the camera Cam1 has the largest error value, the HMD displays the joint J1 corresponding to the re-projection image information of the camera Cam1 in addition to the joint J2 showing the prediction image information. The HMD displays prompt commands to instruct the user to perform calibration action on the camera Cam1. The user can adjust the position or orientation of the target portion according to the prompt command so that the joint J2 of the prediction image information can overlap with the joint J1 of the re-projection image information, as shown in the display screen 512. When all the error values displayed in the error information EI2 are less than the preset tolerance value, the HMD can prompt that the calibration action has been completed.

The above-mentioned tolerance value can be set by the designer without specific restrictions.

Figure 6:
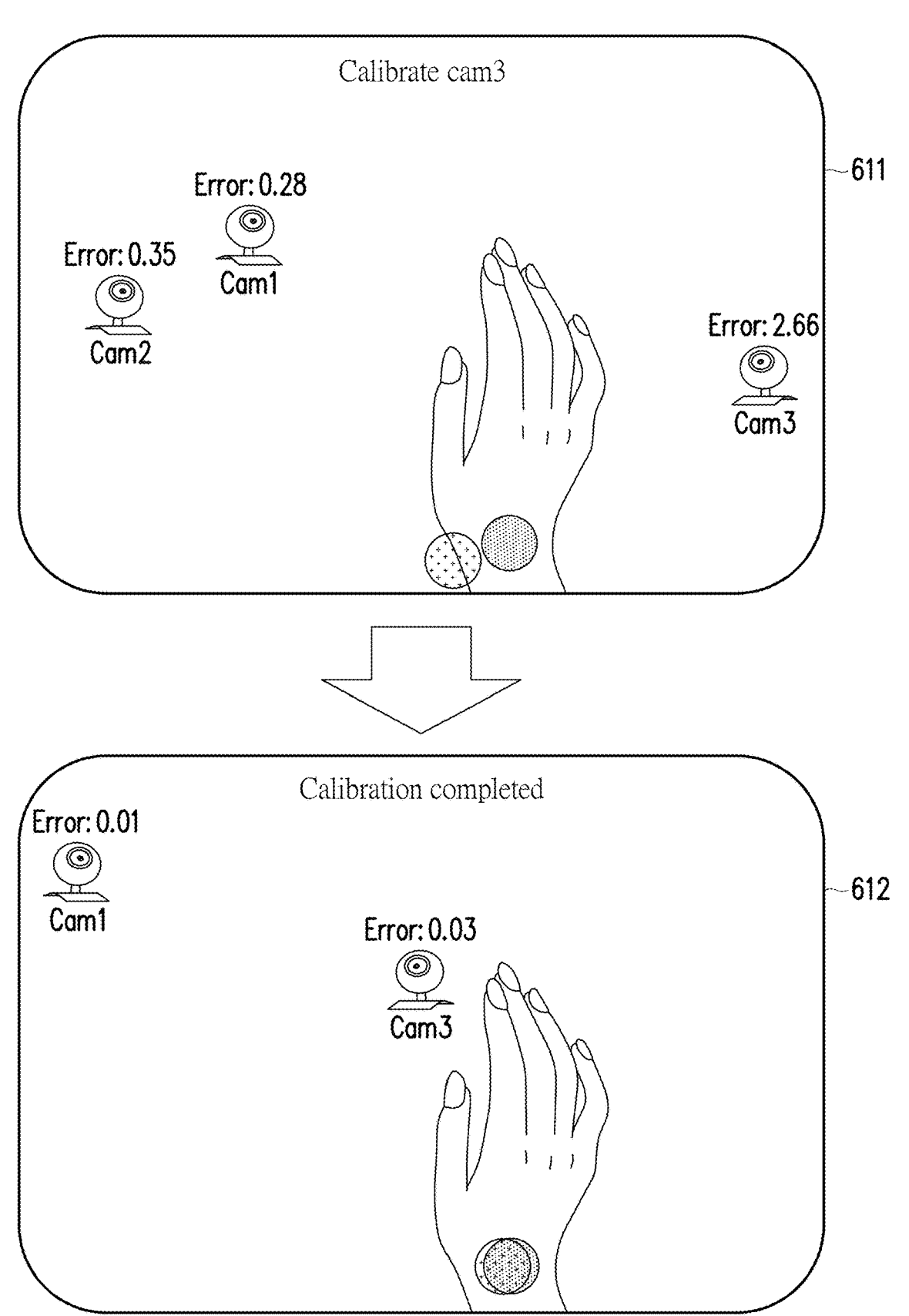
FIG. 6 illustrates a schematic diagram of another calibration action of the virtual image display system.

In addition, in step S450 in FIG. 4B, in another embodiment, instead of displaying the re-projection image information, the HMD can calculate the re-projection difference and indicate the user to face the camera with the largest error by displaying the re-projection error. Referring to FIG. 6 simultaneously, FIG. 6 illustrates a schematic diagram of another calibration action of the virtual image display system.

Among them, in the display screen 611 of the HMD, the HMD can display that error value of the re-projection difference of the cameras Cam1, Cam2 and Cam3 are 0.28, 0.35 and 0.66 respectively. Based on the camera Cam3 having the largest error value, the HMD can instruct the user to perform calibration action for the camera Cam3. The user can adjust its joints to face the camera Cam3 according to the prompt commands provided by the HMD, and thereby reduce the error value corresponding to the camera Cam3.

Similarly, as shown in the display screen 612, when all error values are less than the preset tolerance value, the HMD can prompt that the calibration action has been completed.

Figure 7:
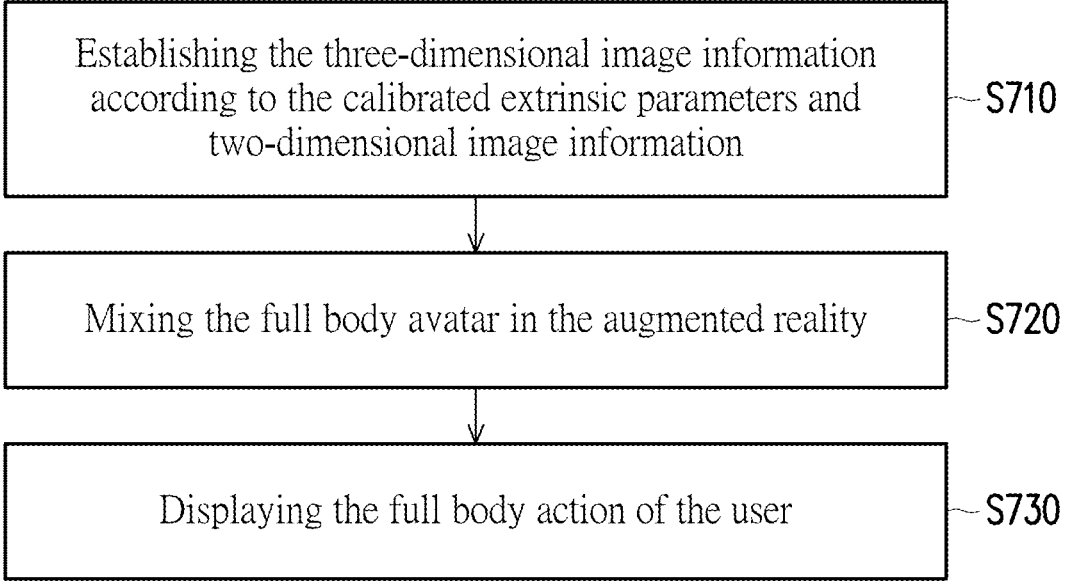
FIG. 7 illustrates a flow chart of another implementation method of the virtual image display system according to the embodiment of the present invention.

Referring to FIG. 7, FIG. 7 illustrates a flow chart of another implementation method of the virtual image display system according to the embodiment of the present invention. After the optimization of the extrinsic parameters between the camera and the HMD is completed, the HMD can create the user's three-dimensional image information based on the calibrated extrinsic parameters and the two-dimensional image information provided by the cameras in step S710. Then, in step S720, the HMD can mix the user's three-dimensional image information with the avatar of the full body in augmented reality. And in step S730, it can display the user's full body movements, such as playing football, running, dancing, etc.

In summary, the virtual imaging system of the present invention enables the camera to take pictures of the user's joints, and performs the calibration action of the extrinsic parameters between the camera and the HMD according to the captured image information. In this way, the calibration action of the extrinsic parameter can be executed anytime and anywhere, reducing the complexity of the operation. Moreover, the virtual imaging system of the present invention provides the interactive calibration action, allowing users to execute the calibration action of the virtual image system through the display screen of the HMD, thereby effectively optimizing the extrinsic parameters of the virtual imaging system and improving the display performance of the virtual imaging system.

What is claimed is:

1. An operation method of a virtual image display system, comprising:
   using a plurality of cameras to perform image capturing action on a target portion of a user, and obtain a plurality of image information;
   using the cameras to obtain a plurality of position information corresponding to the target portion according to the image information;
   using a head-mounted display (HMD) to receive the position information, calculating an extrinsic parameter according to the position information, and establishing a plurality of reprojection image information according to the extrinsic parameter and the position information;
   using the HMD to obtain a plurality of error information according to a prediction image information and the re-projection image information; and
   using the HMD to display each of the error information, and calibrating the extrinsic parameter to generate a calibrated extrinsic parameter according to each of the error information,
   wherein the cameras are disposed external from the HMD.

2. The operation method according to claim 1, further comprises:
   adjusting a position of the target portion corresponding to each of the error information by the user.

3. The operation method according to claim 1, further comprises:
   using each of the cameras to establish posture information of the user according to a posture prediction algorithm;
   using each of the cameras to transmit each of the corresponding posture information to the HMD; and
   using the HMD to display a full-body three-dimensional image of the user according to each of the posture information.

4. The operation method according to claim 1, wherein the step of establishing the re-projection image information according to the extrinsic parameter and the position information comprises:
   triangulating the position information and the location information of each of the cameras based on the extrinsic parameter to establish each of the re-projection image information.

5. The operation method according to claim 1, wherein the step of using the HMD to obtain the error information according to the prediction image information and the reprojection image information comprises:

using the HMD to establish the prediction image information of the user; and calculating a position deviation between the prediction image information and each of the re-projection image information to generate each of the error information.

6. The operation method according to claim 5, further comprises:

using the HMD to project the prediction image information and one of re-projection image information; and using the HMD to guide the user to adjust the position of the target portion so that the prediction image information overlaps with each of the projected re-projection image information.

7. The operation method according to claim 1, wherein the extrinsic parameter comprises rotation and translation information between a coordinate system of each of the cameras and a coordinate system of the HMD.

8. A virtual image display system, comprising:

a plurality of cameras, perform image capturing action on a target portion of a user and obtain a plurality of image information, and the cameras provide a plurality of position information corresponding to the target portion according to the image information; and a head-mounted display (HMD), coupled to the cameras, receives the position information, calculates an extrinsic parameter according to the position information, establishes a plurality of re-projection image information according to the extrinsic parameter and the position information, obtains a plurality of error information according to a prediction image information and the re-projection image information, displays each of the error information, and calibrates the extrinsic parameter to generate a calibrated extrinsic parameter according to each of the error information, wherein the cameras are disposed external from the HMD.

9. The virtual image display system according to claim 8, wherein the HMD is configured to guide the user to adjust a position of the target portion corresponding to each of the error information.

10. The virtual image display system according to claim 8, wherein each of the cameras establishes posture information of the user according to a posture prediction algorithm and transmits each of the corresponding posture information to the HMD, and the HMD displays a full-body three-dimensional image of the user according to each of the posture information.

11. The virtual image display system according to claim 8, wherein the HMD triangulates the position information and the location information of each of the cameras based on the extrinsic parameter to establish each of the re-projection image information.

12. The virtual image display system according to claim 8, wherein the HMD establishes the prediction image information of the user and calculates a position deviation between the prediction image information and each of the re-projection image information to generate each of the error information.

13. The virtual image display system according to claim 8, wherein the HMD projects the prediction image information and one of the re-projection image information and guides the user to adjust the position of the target portion so that the prediction image information overlaps with each of the projected re-projection image information.

14. The virtual image display system according to claim 8, wherein the number of the cameras is greater than or equal to 2.

15. The virtual image display system according to claim 8, wherein the extrinsic parameter comprises rotation and translation information between a coordinate system of each of the cameras and a coordinate system of the HMD.

* * * * *